June 30, 1925.
A. L. BAUSMAN
1,543,745
MACHINE FOR AUTOMATICALLY MOLDING CONFECTIONS
Filed Oct. 27, 1922
6 Sheets-Sheet 1
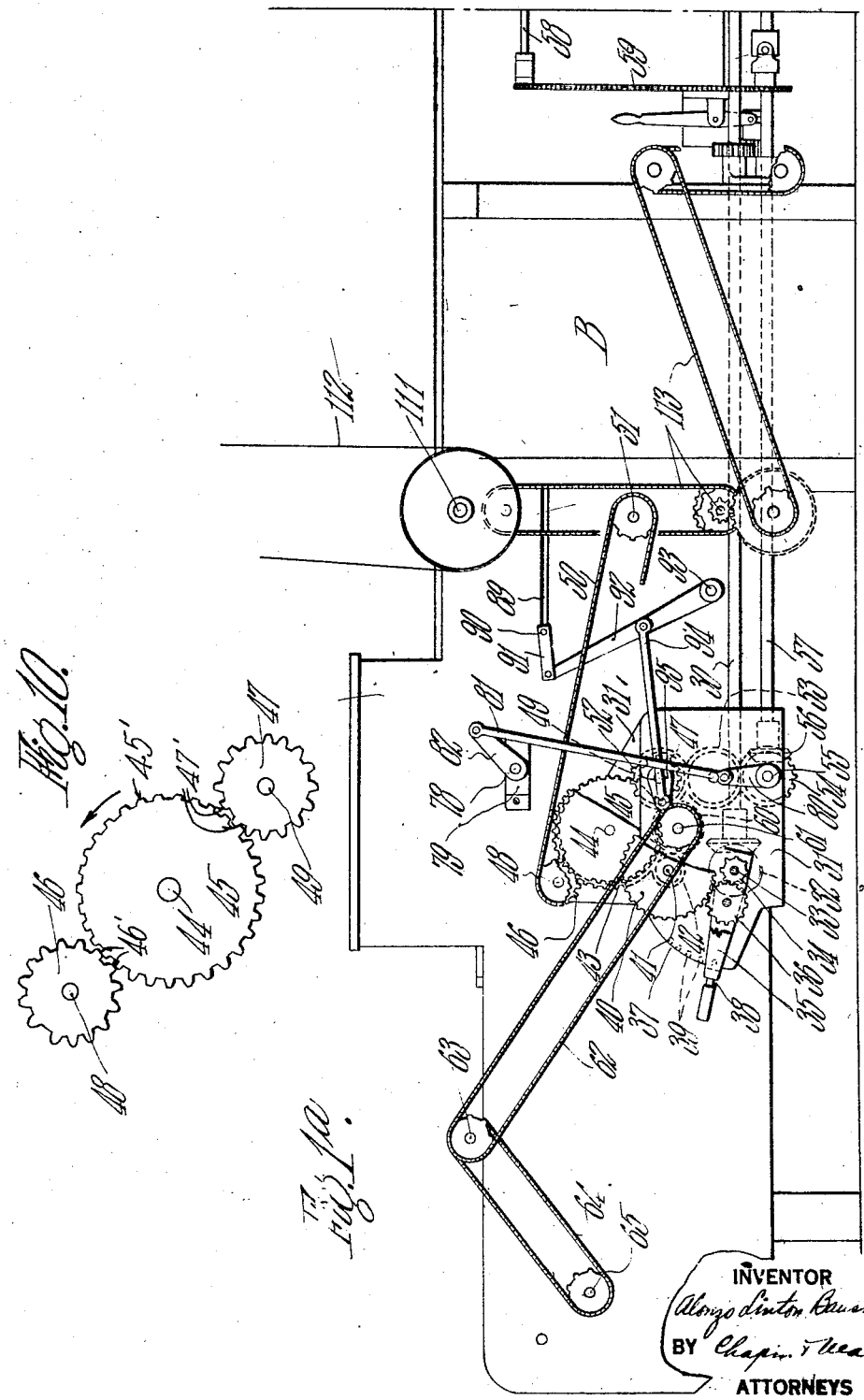
INVENTOR
Alonzo Linton Bausman
BY Chapin & Neal
ATTORNEYS

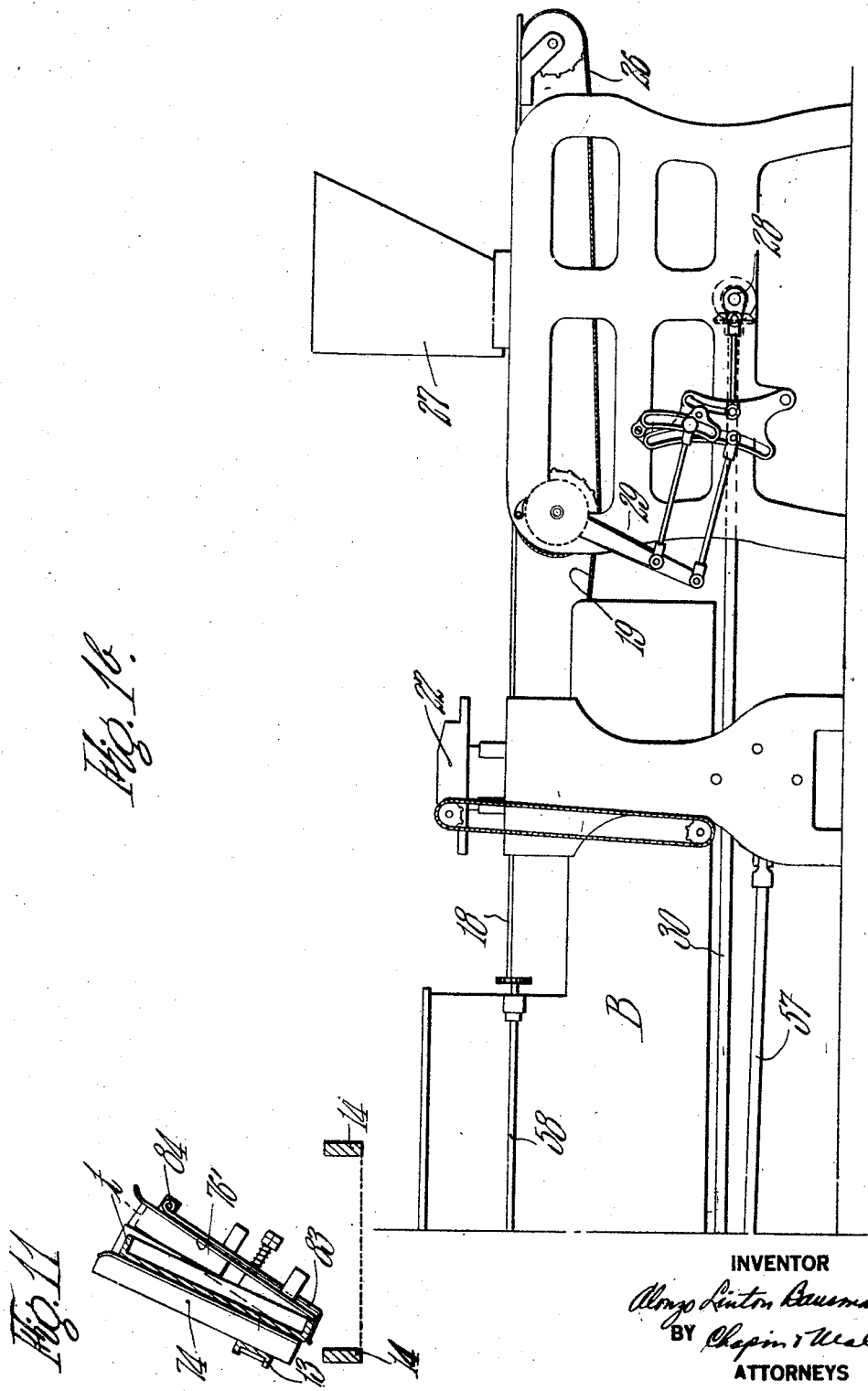

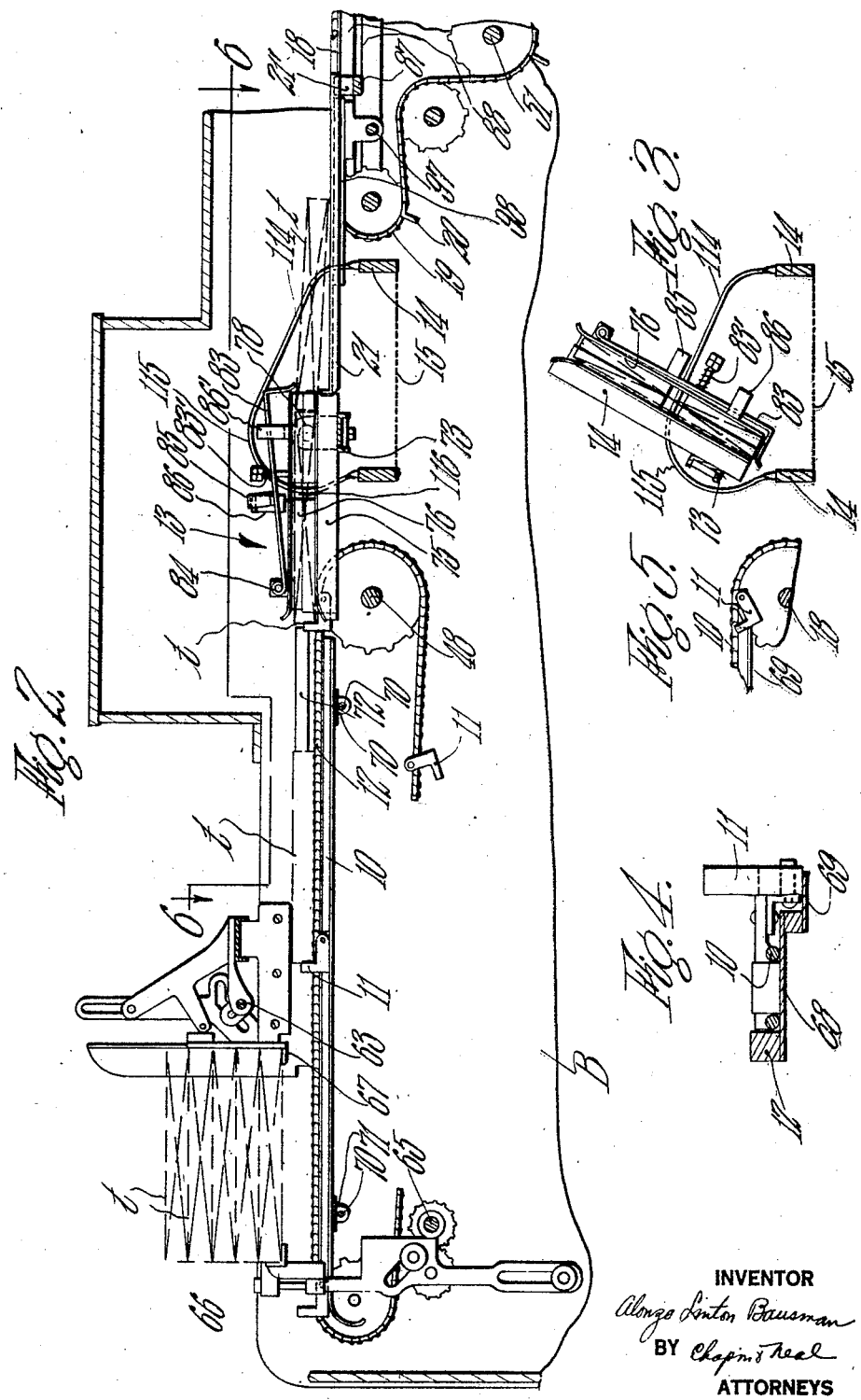

June 30, 1925.
A. L. BAUSMAN
1,543,745
MACHINE FOR AUTOMATICALLY MOLDING CONFECTIONS
Filed Oct. 27, 1922    6 Sheets-Sheet 4
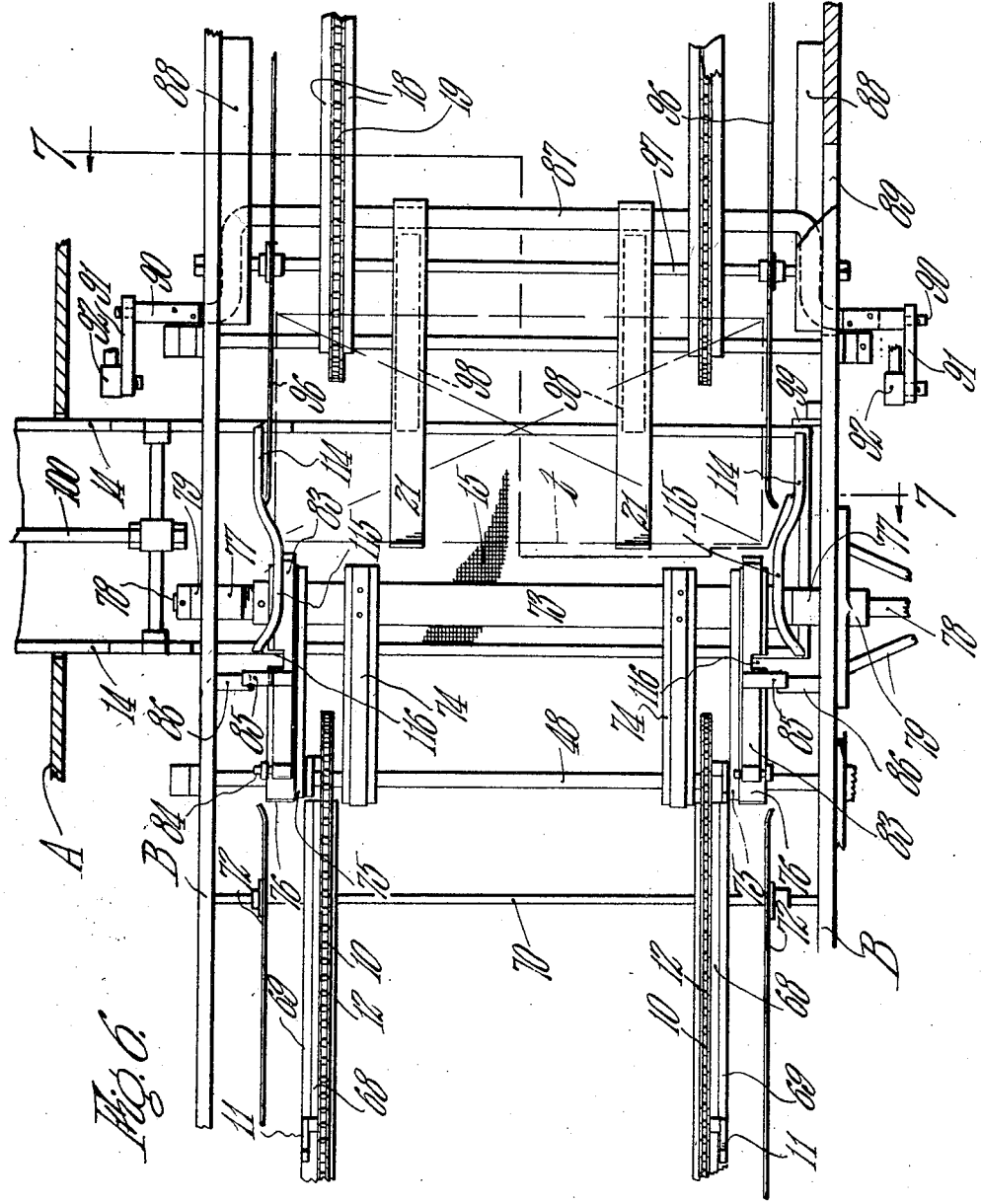
INVENTOR
Alonzo Linton Bausman
BY
ATTORNEYS

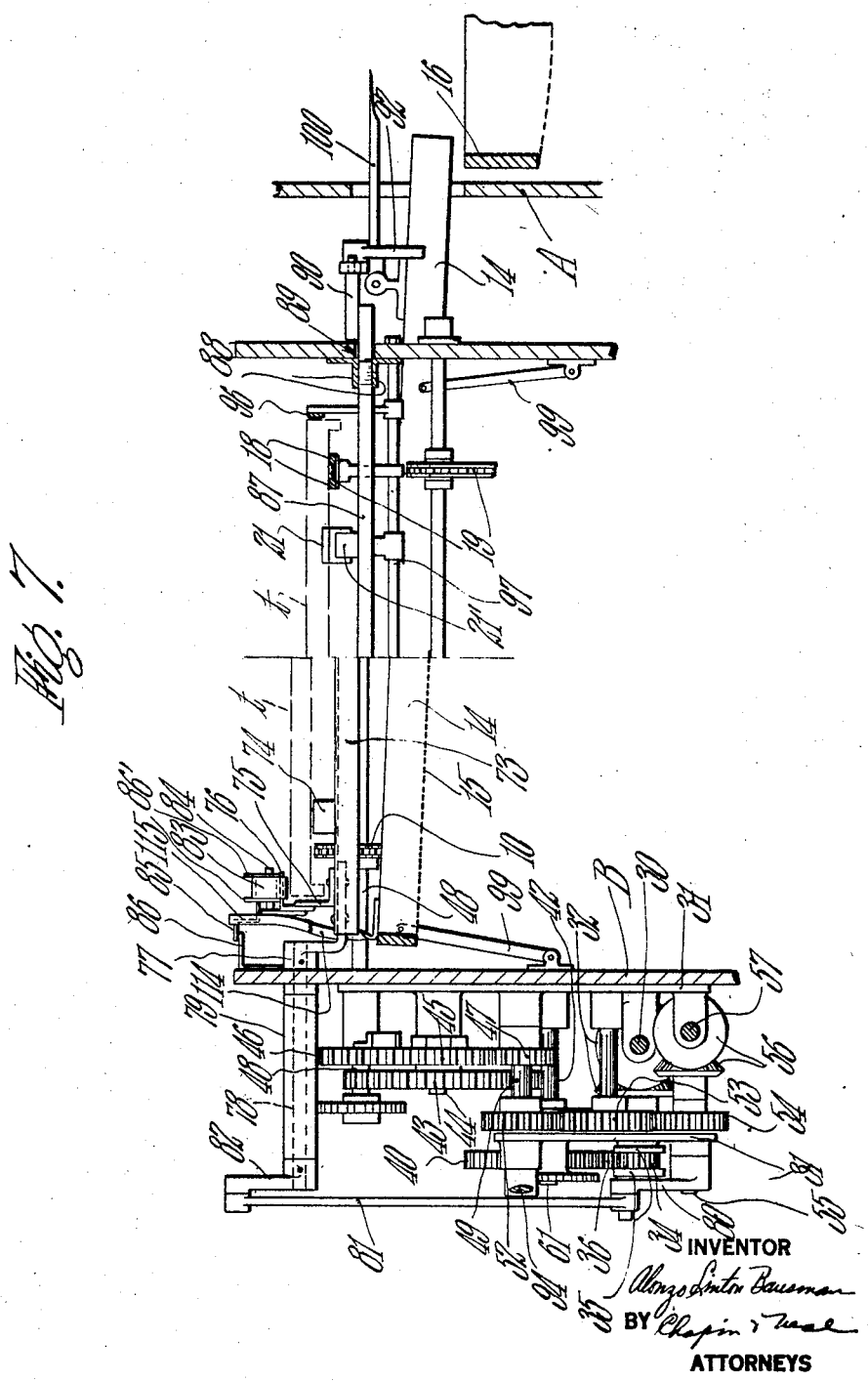

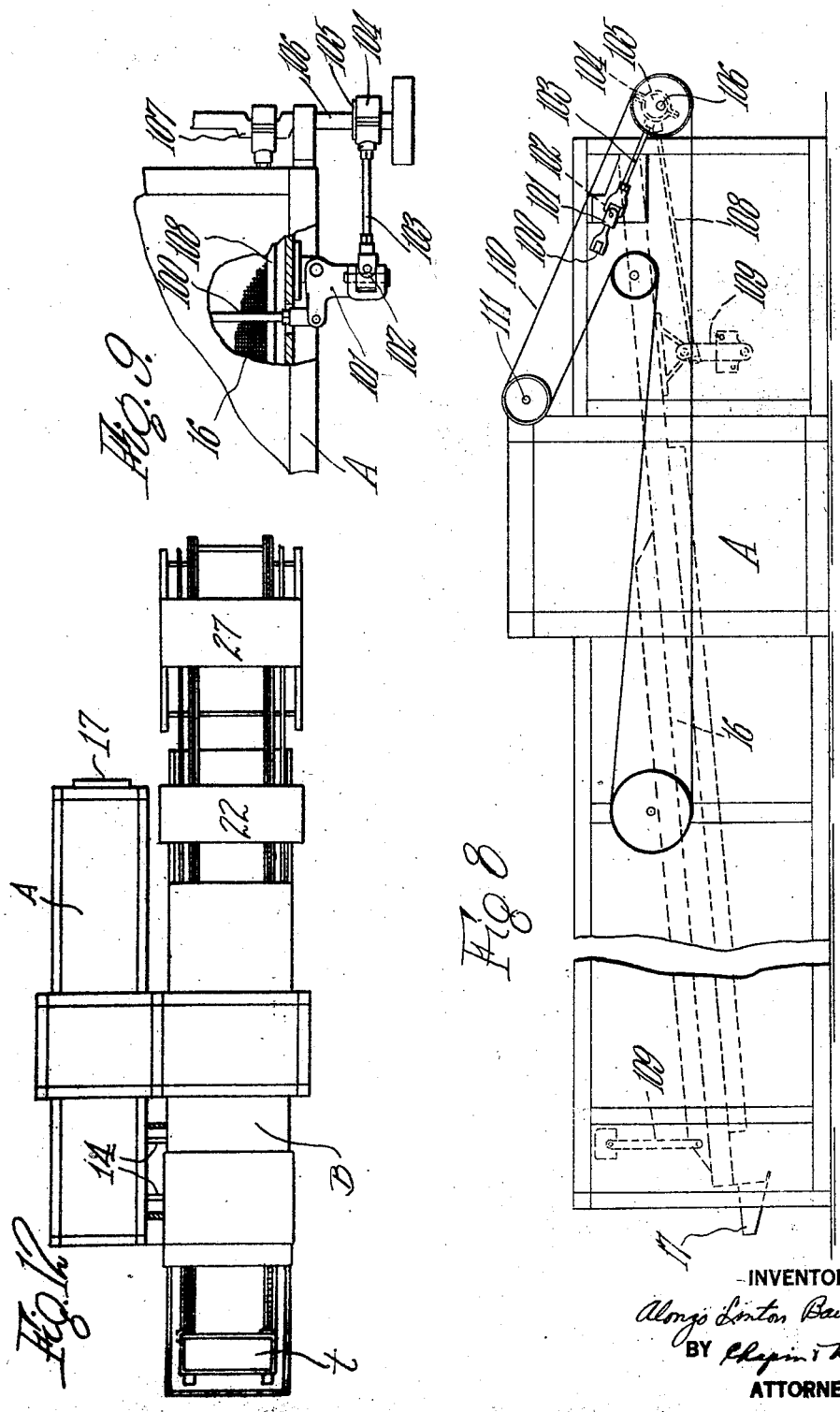

Patented June 30, 1925.

1,543,745

UNITED STATES PATENT OFFICE.

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

MACHINE FOR AUTOMATICALLY MOLDING CONFECTIONS.

Application filed October 27, 1922. Serial No. 597,389.

*To all whom it may concern:*

Be it known that I, ALONZO L. BAUSMAN, citizen of the United States, residing at Springfield, in the county of Hampden and State of Massachusetts, have invented new and useful Improvements in Machines for Automatically Molding Confections, of which the following is a specification.

This invention relates to improvements in machines for automatically molding confectionery.

Examples of the general type of machine, with which this invention is concerned, will be found in U. S. Letters Patent No. 648,353, granted April 24, 1900, on an invention of Gabriel Carlson and in U. S. Letters Patent No. 1,169,602, granted January 26, 1916, on an invention of Alonzo Linton Bausman. The general operations performed in these machines is as follows: Each of a series of trays is successively filled with starch, the latter is uniformly levelled off, impressions or recesses of the desired form are made in the starch, these recesses are then filled with the confectionery material and the latter allowed to set or harden, the trays are then emptied, the starch and molded confections separated and cleaned, and the described cycle of operations repeated.

The general object of the invention is to improve the prior machines disclosed in the above mentioned patents, retaining certain advantageous features and eliminating certain disadvantageous features of each.

More particularly, it is desired to retain those features of the second named patent which relate to the driving mechanism and the provision for improved coordination in the operation of the various units of the machine and to change the arrangement of the sieve (or starch and confection separating means) so that it is more nearly like that shown in the Carlson patent, whereby the sieve is conveniently accessible and more easily inspected and cleaned.

With this general object in view, it has been found desirable to improve the tray emptying mechanism, together with the means for feeding the trays thereto and removing them therefrom, as well as other parts associated with the transfer of the starch and molded confections from the tray to the main separating sieve.

These and other objects will more particularly appear from the following description and in the illustrative embodiment of the invention in the accompanying drawings, in which,—

Fig. 1ª and 1ᵇ, taken together, end to end, show, in more or less conventional form, a front elevational view of the improved machine;

Fig. 2 is a somewhat enlarged sectional elevational view of that part of the machine which is concerned with the emptying of the filled trays together with the movement of the trays into and out of the tray emptying means;

Fig. 3 is a fragmentary view of the tray emptying means, taken similarly to Fig. 2 but showing the latter in emptying position;

Figs. 4 and 5 are fragmentary cross-sectional and elevational views, respectively, showing details of the trackway for the trays and the tray feeding means;

Fig. 6 is a fragmentary sectional plan view taken on the line 6—6 of Fig. 2;

Fig. 7 is a cross-sectional view taken on the line 7—7 of Fig. 6 illustrating the auxiliary sieve, or chute, by which the confections and starch are transferred from the tray emptying means to the main sieve;

Fig. 8 is a small scale rear elevational view of a portion of the machine, illustrating the main sieve and driving connections therefor;

Fig. 9 is a fragmentary plan view, partly in section, showing certain connections for operating the auxiliary sieve;

Fig. 10 is a diagrammatical view of a detail of the operating mechanism shown in Fig. 7;

Fig. 11 is a view taken similarly to Fig. 3 and showing a modification in the dumper; and Fig. 12 is a plan view of the machine.

Referring to these drawings; trays *t* which are filled with confections molded in starch and are arranged in a vertical stack at one end of the machine (Fig. 2), are successively presented to a tray feeding mechanism, which consists of a pair of endless chains 10, having lugs 11 which engage and remove the lowermost tray *t* of the stack and carry it forward along trackways 12. The chains 10 operate intermittently and feed the trays forward in steps, a tray being eventually moved into a dumper 13, or tray emptying means.

This dumper 13, also operating intermittently, tilts upwardly, during a period of rest of chains 10, into a position such as shown in Fig. 3 and dumps the contents of the tray into a transversely arranged chute 14, which is preferably constructed with a foraminous bottom 15, as shown, so that it may also function as a sieve. This sieve is auxiliary to a main sieve 16, which is indicated in Figs. 7 and 8, and is arranged at right angles to member 14. The latter is inclined downwardly toward sieve 16 and is given a longitudinal vibratory motion by which the starch and confections are urged into the sieve 16. The latter, which parallels the trackways 12 but is arranged in back of the latter, is also inclined downwardly and is also given a longitudinal vibratory motion (see Fig. 8) to urge the starch and confections therealong. Due to the vibration of the sieve and its foraminous bottom, the starch is separated from the confections and passes into the bottom of the casing A, within which the sieve 16 is housed. The confections, however, remain on, and travel down, the sieve and are subjected to the action of cleaning mechanism, such as is disclosed in the above mentioned patents,—the cleaned confections eventually being delivered out of casing A at 17.

The starch falling through sieve 16 is collected, elevated above trackways 18 (Fig. 2) and deposited into trays which are moved along these trackways by tray feeding mechanism consisting of a pair of endless chains 19, having at suitable longitudinal intervals tray engaging lugs 20.

The empty tray in the dumper 13 is moved out of the latter by abutment with an incoming tray while the dumper is at rest in the position illustrated in Fig. 2. The empty tray, thus removed, is deposited on a pair of longitudinally reciprocating hooks 21, which, when the tray feeding chains 10 and 19 come to rest, operate simultaneously with the dumper and move forwardly (toward the right) carrying the tray onto the trackways 18 in position to be engaged by lugs 20 when chains 19 are again set in motion. The hooks move back into the position illustrated in Fig. 2 simultaneously with the return of the dumper 13 from the position shown in Fig. 3 to that shown in Fig. 2.

The means by which the starch is elevated to and deposited in the trays is substantially like that disclosed in the above mentioned patents and requires no further description here. From the tray filling mechanism the tray $t$ passes to a levelling device which strikes off the excess starch, leaving the tray level full of starch. This mechanism, as well as the tray filling mechanism, is contained within a covered casing B, and is not illustrated herein,—being fully disclosed in the patents above mentioned. The tray $t$, emerging from this casing, passes along the trackways 18 into a printer 22, which is substantially like that shown in the Carlson patent, above referred to, and which functions to make impressions or mold recesses in the starch during an interval of rest of chains 19.

The latter deliver the tray $t$ to the driving chains 26 of a depositor 27, which is substantially like that shown in the Bausman patent, above referred to, and need not be described in detail. Suffice it to say that the depositor mechanism, which delivers measured charges of confection into the mold recesses in tray $t$, and the mechanism for feeding the trays thereto, comprising the chains 26, are operated intermittently and alternately from a main drive shaft 28. The tray $t$ may have various numbers of rows of mold recesses therein and adjustable feeding mechanism, such as that conventionally indicated at 29 and fully disclosed in the above identified Bausman patent, is provided to operate the chains 26 from shaft 28 intermittently by steps of various lengths. The trays $t$ are also moved intermittently by the chains 10 and 19 but by relatively large steps which are greater than the length of the trays. It is necessary therefore to coordinate the various tray feeding mechanisms and this is done in the general manner disclosed in the Bausman patent above referred to, but by specifically different mechanism which will next be described.

A shaft 30 (Figs. 1ª and 1ᵇ) is driven from the main drive shaft 28 of the depositor and extends rearwardly along the machine to a transmission mechanism mounted in a frame 31 secured to a side wall of casing B at a location closely adjacent the dumper 13. Shaft 30 is the driver for this transmission and is connected by bevel gears 32 to a stub shaft 33, which is mounted in frame 31 and extends forwardly thereof to receive a pinion 34. Fulcrumed on shaft 33 is a lever 35 carrying a gear 36, which is constantly in mesh with pinion 34, and this lever plays over a segment 37 and may be held in various positions of adjustment by suitable means such as the radially movable pin 38 which is engageable in any one of the recesses 39 in segment 37. Gear 36 meshes with a gear 40 on a shaft 41 and gear 40 is the change gear of the variable speed transmission. That is, gear 40 may be removed and gears of other sizes substituted to vary the speed of shaft 41 and the parts driven thereby for coordinating the tray feeding means, dumper 13 and hooks 21 with the depositor to obtain the results disclosed in the aforesaid Bausman patent. Fixed on shaft 41 is a pinion 42 which drives a gear 43 on a shaft 44. Fixed on the latter to the rear of gear 43 is a suitable intermittent gear 45 which is arranged to drive intermittently and alternately two oppositely located gears 46 and 47, fixed on shafts 48 and 49, respectively. The intermittent gears described may be constructed in any of the usual and well known ways but, as an illustrative example of one way, the teeth of gear 45 on one half of its periphery may be cut away at the pitch line, as at 45', and the gears 46 and 47 provided with concave milled out portions 46' and 47' which have a radius equal to that of the pitch circle of gear 45. As shown, gear 46 has just come to rest and gear 47 has just commenced to turn. The cut away portion 45' and the concave portion 47' have been substantially coincident so that gear 45 turns without turning gear 47 but as soon as the full teeth of gear 45 engage gear 47 the latter will be turned. In the case of gear 46, the full teeth have just become disengaged from pinion 46 and the latter brought into such position that the concave portion 46' coincides with the pitch circle of gear 45, whereby the latter can turn without turning gear 46. The diameter of gears 46 and 47 is half that of gear 45, whereby each is turned one full revolution by the full teeth in gear 45. Shaft 48 is the driving shaft for the tray feeding mechanism and directly drives the described chains 10, as shown in Fig. 2. It also is arranged to drive, by a chain 50 and suitable sprockets, a shaft 51, which, as indicated in Fig. 2, carries suitable sprockets to drive chains 19. Shaft 49 drives those elements of the machine which operate during an interval of rest of the tray feeding means. Thus, shaft 49 has fixed thereto a gear 52 which, through an idler gear 53, drives a gear 54 on a shaft 55. The latter is connected by bevel gearing 56 with a shaft 57 which extends rearwardly in substantially parallel relation with shaft 30 to operate the printer, as well as certain other mechanism in casing B, which needs to be operated simultaneously therewith as outlined in the above mentionel Bausman patent,—the driving connections for such mechanism being indicated in Figs. 1ª and 1ᵇ as a shaft 58 driven by a chain 59 and suitable sprockets from shaft 57. The gear 52, heretofore described, also meshes with a gear 60 on a shaft 61 which is connected by a chain 62 and suitable sprockets to drive a shaft 63 and the latter drives, by a chain 64 and suitable sprockets, a shaft 65.

These two shafts, as will be seen from Fig. 2, operate a mechanism substantially identical with that shown in the above named Carlson patent comprising arms 66 and 67 which are movable downwardly to lower the stack of trays t until the lowermost strikes the trackways 12, then outwardly away from the tray to release the latter, then upwardly and at the latter part of the upward movement, inwardly to engage the tray next above the lowermost one and lift it slightly to take the weight of the stack off the lowermost tray so that the latter can be fed forward by chains 10.

The latter, as indicated in Fig. 2, are mounted on suitable sprockets and driven from shaft 48. The upper lap of chains 10 ride on a horizontal runway 68 (Fig. 4) and fixed to this runway is a parallel runway 69, disposed in a somewhat lower plane, along which ride the lugs 11. The latter are right angular in shape and are pivoted to chains 10,—the lower leg of the lug riding on runway 69 and the vertical leg engaging tray t. The trackway 12 and runways 68 and 69 are secured together and suitably supported in the casing B, as indicated in Figs. 2 and 6, by brackets 70 and transverse members 71. Side guides 72 for the trays, are also provided and supported by the members 70 and 71.

The tray emptying means, indicated generally in Fig. 2 by reference numeral 13, is a skeleton frame, herein shown as consisting of a transverse channel iron 73 to which are attached a pair of tray supporting runways 74 and a pair of oppositely disposed channel shaped end guides or jaws, which latter are made up of two angle irons 75 and 76. The members 74, 75 and 76 are secured at or near one end to channel 73 and extend rearwardly thereof. To the ends of member 73 are attached brackets 77 carrying rods 78, which are journalled in brackets 79 secured to the side walls of casing B, whereby the dumping frame is pivotally supported to swing about an axis parallel to and closely adjacent the front and longest side of tray t.

The dumping frame is oscillated intermittently and during periods of rest of the tray feeding means by a crank 80 on the described shaft 55, which crank is connected by a link 81 to a crank 82 on one of the pivot rods 78 of the dumping frame. The latter is open at both ends to receive trays t and permit them to be discharged and, when at rest, is horizontally disposed with its runways 74 in the same horizontal plane as the runways 12 so that the lugs 11 may move the tray t into the dumping frame as shown in Fig. 2. As the tray, thus positioned, starts to swing upwardly in the dumping frame, the lugs 11 drop into the position shown in Fig. 5, the runways 69 being cut short to permit this action, the purpose of which is to get the lugs out of the path of the tray when it is returned to horizontal position. This is a desirable feature because the tray might shift slightly during the operation of the dumping frame and, unless the lugs "disappeared" as described, the tray might be brought down upon them causing damage.

In order to prevent tray $t$ from falling out of the dumping frame during its swinging movement, a hook 83 is provided for each jaw of the frame, being pivoted at 84 to a bracket fixed to angle iron 76. The long leg of each right angularly bent hook is arranged to abut the top face of its angle iron 76, when the frame 13 swings, thus allowing the shorter leg to drop sufficiently to engage the forward edge of the tray $t$, and close the otherwise open forward end of the jaw. The hook, when released, is forced down by a spring 83' into the described position, as the dumping frame commences its upward swinging movement, and is elevated at the end of the return movement by lugs 85 on the hook engaging lugs 86 fixed to the adjacent side walls of casing B. Upstanding pairs of arms 86' on members 76 form side guides for the hooks 83.

After the tray $t$ has been emptied and the dumping frame 13 has returned to horizontal position, the chains 10 are actuated and another tray $t$ pushed into frame 13, thereby pushing the empty tray out, as illustrated in Fig. 2, wherein the empty tray is about to drop on the reciprocable hooks 21. As soon as this occurs, the hooks 21 move forwardly (to the right) and carry the tray onto trackways 18 in position to be later engaged by the lugs 20 on chains 19. The hooks 21 move rearwardly as the dumping frame returns and again assume the position illustrated in Fig. 2. These hooks 21 are secured at their forward ends to blocks 21' which in turn are fixed to a cross bar 87 (Fig. 6) the ends of which are bent at right angles to provide longitudinal portions which are slidingly engaged with, and lie between, pairs of horizontal guides 88. The extreme ends of cross bar 87 are again bent at right angles to parallel the main portion of the bar and these ends extend outwardly through slots 89 in the side walls of casing B and have attached thereto trunnions 90 (Fig. 7). Each trunnion 90 is connected by a link 91 to the upper end of a lever 92 and both levers are fixed at their lower ends to a transverse shaft 93 mounted in casing B. One of the levers 92 (Fig. 1ª) is connected by a link 94 to a crank 95 which is fixed on the described shaft 49.

The chains 19 are mounted on suitable sprockets, as indicated in Fig. 2, and their upper laps travel between the two members forming the trackways 18, as shown in Fig. 7. These trackways, as well as the side guides 96, are supported by suitable brackets from cross rods such as 97. The latter also support comparatively long blocks 98 which fit into the channel shaped under sides of hooks 21 and furnish guides for the latter in their sliding movement.

The tray, $t$, when tilted into the position shown in Fig. 3 discharges its contents into the chute 14, which may, as shown, have a foraminous bottom 15. This chute is disposed transversely in casing B and at the rear end of the machine extends outside the casing and passes into the described casing A to discharge its contents into the main sieve 16. Chute 14, pivotally connected to links 99, which are pivoted to casing B, is given a longitudinal vibratory motion by the following mechanism. A rod 100, pivotally connected to chute 14 as shown in Fig. 7, extends into and through casing B, and is pivotally connected to one arm of a bell crank lever 101, which is pivoted to casing A, as shown in Fig. 9. The other arm of lever 101 is connected by a universal joint 102 to one end of a rod 103, which at its other end is connected to an eccentric strap 104 engaged with an eccentric 105 on a shaft 106. This shaft also has a crank 107 and a link 108 connects this crank to the main sieve 16, whereby to vibrate it,—the main sieve being supported by links 109 for this purpose. Shaft 106 is driven by a belt 110 and suitable pulleys from a shaft 111 which extends across the machine and is driven from any suitable source of power by a belt 112 (Fig. 1ª). This shaft 111 also serves to operate the starch elevating and tray filling mechanism by suitable means which need not be described in detail and which are represented as a whole, by reference numeral 113.

The vibratory motion imparted to chute 14 is made use of for the purpose of rapping the trays $t$ while in the dumper 13, the better to loosen the contents and facilitate the emptying operation. To this end, straps 114, disposed one adjacent each end of the dumper, are secured to the side walls of chute 14 and are each so bent as to form a portion 115 which is curved concentrically with the pivots 78 of the dumper. Slots 116 are cut in the angle irons 75 and 76 of the latter to receive the portions 115. The latter are offset inwardly from the body portions 114 so as to alternately engage the end walls of tray $t$ as the chute vibrates. The vibratory motion of the chute is continuous but, as will be clear from Fig. 6, the portions 115 cannot strike the tray until it is swung upwardly by the dumper. The effect of this arrangement is to rap the tray during the emptying operation, the tray being moved back and forth transversely in the dumper.

In Fig. 11, a slight modification in the dumper 13 is shown,—the upper jaw 76' being arranged to converge with respect to the lower jaw in the direction of travel of the tray. This results in allowing the tray to swing in a longer arc than the dumping frame and also causes the tray to bring up against the upper jaw 76' with a sharp rap, thereby aiding materially in loosening the contents of the tray.

The operation of the machine will sufficiently appear from the foregoing description.

The dumper 13, and more especially its particular pivotal mounting, as well as its arrangement for cooperation with the chute, or sieve, 14, is considered especially important and advantageous in a machine of the general character herein set forth. These features make is feasible to locate the starch and confection separating means, or sieve 16, back of the line of travel of the trays and in nonunderlying relation therewith, whereby the sieve is conveniently accessible, as in the Carlson patent. A distinct improvement over the latter results from the pivoting of the dumping frame for swinging movement about an axis which is parallel to and very closely adjacent the long, rather than the short side of the tray. The distance through which the confections fall, and thus the liability of breakage, is considerably diminished and a much better distribution of the emptied contents of the tray on the sieve results. Thus, the contents of the tray are spread along the sieve 14 instead of being dumped in a heap as in the Carlson patent. The material, intermittently dumped into, and reasonably well distributed on sieve 14 is fed to the main sieve 16 continuously but in relatively small quantities, thereby resulting in far superior distribution on the main sieve and speedier and more effective separation than has been possible with prior practice.

The invention has been disclosed herein, in an embodiment at present preferred, for illustrative purposes but the scope of the invention is defined by the appended claims rather than by the foregoing description.

What I claim is:

1. In a confectionery molding machine, spaced trackways for trays, a pivoted tray emptying device interposed between the trackways and operable to successively receive trays one by one from one trackway, empty them and permit them to be discharged to the other trackway, a chute disposed with its longitudinal axis transverse to the line of travel of the trays on said trackways to receive the contents of the trays emptied by said device, and means for separating the contents of trays, said means mounted to receive the discharge from said chute and disposed substantially transversely to said chute.

2. In a confectionery molding machine, spaced trackways for trays, a pivoted tray emptying device interposed between the trackways and operable to successively receive trays one by one from one trackway, empty them and permit them to be discharged to the other trackway, a sieve disposed with its longitudinal axis transverse to the line of travel of the trays on trackways to receive the contents of the trays emptied by said device, and a second sieve mounted to receive the discharge from the first sieve and disposed substantially transversely to said chute.

3. In a confectionery molding machine, spaced trackways for trays, a pivoted tray emptying device interposed between the trackways and operable to successively receive trays one by one from one trackway, empty them and permit them to be discharged to the other trackway, said device pivoted to swing about an axis at right angles to the line of travel of the trays on the trackways and closely adjacent one edge of the tray positioned therein.

4. In a confectionery molding machine, a tray emptying frame having jaws to receive the ends of a tray, said jaws having a length approximately commensurate with the short sides of the tray and being spaced by a distance approximately commensurate with the long sides of the tray, and means pivotally supporting said frame to swing about an axis at right angles to said jaws, said axis being located nearer one end of said jaws than the other.

5. In a confectionery molding machine, tray emptying means, comprising, a member adapted to be pivotally supported at opposite ends, and transversely disposed tray receiving jaws carried by said member and projecting a greater distance beyond one side of said member than the other.

6. In a confectionery molding machine, endless tray conveying means, lugs connected at suitably spaced intervals thereto, each of said lugs having a portion one end of which is pivotally connected to said means and a second portion projecting substantially transversely from the other end of the first named portion and adapted to engage a tray, and a support underlying the first named portions of said lugs for a portion of the upper lap of travel of said means to hold the lugs in tray engaging position, said lugs eventually riding off said support and moving out of tray engaging position.

7. In a confectionery molding machine, intermittently operable endless tray conveying means including tray engaging lugs, a tray emptying device into which a tray is moved by said means, said device movable during an interval of rest of said means to tray emptying position and back again to tray receiving position, said lugs being pivoted to said means and constructed, when released, to fall away from the engaged tray, and a runway along which said lugs ride and by which they are held in tray engaging position, said runway terminating at a point such that the lugs are seccessively released as soon as they have moved their trays into said device.

8. In a confectionery molding machine, spaced trackways for trays, a pivoted tray emptying device interposed between the trackways and operable to successively receive trays one by one from one trackway, empty them and permit them to be discharged to the other trackway, a chute disposed with its longitudinal axis transverse to line of travel of the trays on said trackways to receive the contents of the trays emptied by said device, means for separating the contents of trays, said means mounted to receive the discharge from said chute and disposed substantially transversely thereto, and means carried by said chute to rap the ends of the tray in said device.

9. In a confectionery molding machine, a pivoted frame arranged when in one position to receive a tray and intermittently operable to turn the tray to first empty the contents and then assume its tray-receiving position, a chute to receive the contents discharged from the trays, said chute disposed with its longitudinal axis substantially parallel with the pivotal axis of said frame, means for imparting a longitudinal reciprocating movement to said chute, and means on the latter for engaging the ends of a tray while in said frame and rapping the latter in a direction parallel to the pivotal axis of said frame.

10. In a confectionery molding machine, a pivoted frame arranged when in one position to receive a tray and intermittently operable to turn the tray to first empty the contents and then assume its tray-receiving position, a chute to receive the contents discharged from the trays, said chute disposed with its longitudinal axis substantially parallel with the pivotal axis of said frame, means for imparting a longitudinal reciprocating movement to said chute, and means on the latter for engaging the ends of a tray while in said frame and rapping the latter in a direction parallel to the pivotal axis of said frame, said last named means constructed and arranged to rap the tray only after said frame has commenced its turning movement.

11. In a confectionery molding machine, a pivoted frame arranged when in one position to receive a tray and intermittently operable to turn the tray to first empty the contents and then assume its tray-receiving position, jaws on said frame to receive the ends of the tray, a chute to receive the contents discharged from the trays, said chute disposed with its longitudinal axis substantially parallel with the pivotal axis of said frame, continuously operable means for imparting a longitudinal reciprocating movement to said chute and members carried by the latter and arranged one adjacent each of said jaws, said members having portions curved concentrically with the pivotal axis of said frame and so spaced as to alternately engage the end walls of the tray during the latter part of the turning movement of the tray and vibrate the latter.

12. In a confectionery molding machine, spaced trackways, a pivoted tray emptying frame interposed therebetween and having jaws with opposite open ends to permit a tray to be moved in from one trackway and discharged onto the other trackway, and means operable as the frame commences to turn to close one of the open ends of said jaws.

13. In a confectionery molding machine, spaced trackways, a pivoted tray emptying frame interposed therebetween and having jaws with opposite ends to permit a tray to be moved in from one trackway and discharged onto the other trackway, members pivoted to said jaws and tending to automatically move into position to close one open end of each, and means engageable with said members when the frame is moved into tray-receiving position to move the members out of the first named position and open said ends of the jaws.

14. In a confectionery molding machine, spaced trackways for trays, a pivoted tray emptying device into which trays are moved from one trackway and out of which trays are discharged to be delivered to the other trackway, the last named trackway being spaced from said device leaving a gap, means for intermittently swinging said device about its pivotal axis, and intermittently reciprocable means operable simultaneously with said device to receive the tray discharged therefrom and carry it to the second named trackway.

15. In a confectionery molding machine, spaced trackways for trays, a pivoted tray emptying device into which trays are moved from one trackway and out of which trays are discharged to be delivered to the other trackway, the last named trackway being spaced from said device leaving a gap, slidable members movable in the plane of the second named trackway, operating means for said members to project them across the gap and hold them there while a tray is being discharged from said device and subsequently to draw the tray across the gap into the second named trackway.

16. In a confectionery molding machine, intermittently operable tray conveying means, an intermittently movable tray emptying device arranged when at rest to receive a tray from said means and from which when at rest a tray is discharged by abutment with an incoming tray, a second tray conveying means and tray supporting runways therefor so spaced from said device as to be incapable of receiving the discharged tray, intermittently reciprocable hooks mounted to slide in the plane of said runways, and when at rest projected from the latter toward said device to receive the discharged tray, and means operable simultaneously with said device to move the hooks to draw the tray to the second named runway and then retract leaving the tray positioned so as to be subsequently engaged by the second tray conveying means.

17. In a confectionery molding machine, tray emptying means, comprising a transverse member adapted to be pivotally supported at its ends, and frame members including tray receiving jaws fixed to said member and projecting a greater distance beyond one side of said member than the other, said jaws arranged to converge toward the pivotal support for said member.

In testimony whereof I have affixed my signature.

ALONZO LINTON BAUSMAN.